United States Patent [19]

Satake

[11] 4,430,230

[45] Feb. 7, 1984

[54] METHOD FOR REMOVAL OF IMPURITIES FROM LIQUID MIXTURES

[75] Inventor: Takeo Satake, Wakayama, Japan

[73] Assignee: Nippon Chemtec Consulting Inc., Osaka, Japan

[21] Appl. No.: 201,605

[22] Filed: Oct. 28, 1980

[30] Foreign Application Priority Data

Oct. 30, 1979 [JP] Japan ................................ 54-140974
Dec. 24, 1979 [JP] Japan ................................ 54-168961
May 12, 1980 [JP] Japan ................................ 55-063001

[51] Int. Cl.$^3$ ............................................. B01D 15/00
[52] U.S. Cl. ................................... 210/691; 210/693; 210/708; 210/729; 210/732; 210/918
[58] Field of Search ............... 210/660, 691, 918, 924, 210/680, 693, 690, 692, 702, 708, 729, 730, 732, 767, 908, 918

[56] References Cited

U.S. PATENT DOCUMENTS

| | | | |
|---|---|---|---|
| 2,367,384 | 1/1945 | Tymstra et al. | 210/680 |
| 3,567,660 | 3/1971 | Winkler | 210/693 |
| 3,617,566 | 11/1971 | Oshima et al. | 210/693 |
| 4,160,729 | 7/1979 | Wilcox | 210/691 |

*Primary Examiner*—Ivars C. Cintins
*Attorney, Agent, or Firm*—Birch, Stewart, Kolasch & Birch

[57] ABSTRACT

A method for the removal of liquid or solid impurities from an impurities-containing liquid mixture wherein the impurities immiscible or occasionally miscible with the liquid medium are emulsified or finely suspended in the liquid medium, which comprises kneading the impurities-containing liquid mixture with a viscoelastic material having an affinity with said impurities and having substantially no affinity with said liquid medium, and thereby having the viscoelastic material take up the impurities and separating out the purified liquid medium. According to this method, various liquid wastes can be purified, and noble resources can be recovered from the wastes and re-used, and the separated liquid medium, particularly aqueous medium which is not useful can be thrown away without encountering problems of environmental pollution.

11 Claims, No Drawings

METHOD FOR REMOVAL OF IMPURITIES FROM LIQUID MIXTURES

The present invention relates to a method for the removal of impurities from liquid mixtures containing the impurities. More particularly, it relates to a method for removal of liquid or solid impurities contained in a liquid medium by kneading the impurities-containing liquid medium with a highly viscoelastic material having an affinity with said impurities and having substantially no affinity with said liquid medium at a high shearing force and whereby the viscoelastic material will take up the impurities.

Various liquid wastes such as factory aqueous wastes, gases-washing liquids, aqueous wastes in coal, iron or other industries, and aqueous wastes containing various crude oily substances such as ultra heavy oils, oil tank sludges, oily substances of oil refinery wastes or oil tanker wastes, etc. contain some liquid or solid impurities which are usually immiscible or occasionally miscible with the liquid medium and are emulsified or suspended into the liquid medium. Hence, these wastes can not be thrown away or reused unless the impurities are removed therefrom. In order to remove such impurites, various methods such as filtration, centrifugation, rectification, extraction, adsorption, or ion exchange are usually employed. For instance, in the case of removal of liquid impurities, the liquid mixture is treated with coagulating agents to aggregate the impurities, followed by filtration with a filter, or subjecting the liquid mixture to reverse osmosis. In the case of solid impurities, the impurities are usually removed by filtration or centrifugation. However, according to these methods, when the impurities are contained in the form of very fine particles or in the state of emulsion, they are hardly removable. Particularly, in the case of a suspension containing impurities of one-hundred to several hundred microns, the suspension is treated with ultra-filtration, but the micropores of the filter are occasionally closed with the impurities during the filtration, thereby requiring frequent re-washing. Besides, when such a suspension is concentrated in order to separate the impurities, scale is unfavorably built up on the wall of the heating vessel, which results in poor operation. Moreover, when a suspension containing one-hundred to several percent impurities is subjected to filtration, too large of an area of filtration is required owing to a large amount of liquid to be treated, and when the impurities are separated by evaporation of the aqueous wastes, too large an amount of energy is required. Accordingly, in such cases, the impurities are removed by using several unit processes, which are unfavorable from the viewpoints of economy and environmental pollution.

More particularly, although washing of gases in an oil refinery is usually carried out by using diluted sulfuric acid aqueous solution, a part of the hydrocarbons contained in the gases is sulfonated during the washing step whereby the sulfonated hydrocarbons form micelle in the diluted sulfuric acid solution and the carbon particles to be removed are embraced in the micelle thus formed. As a result, the diluted sulfuric acid washing liquid becomes unfavorably highly viscous, and hence, the washing procedure can hardly be continued. In order to remove the sulfonated hydrocarbons and to decrease the viscosity of the diluted sulfuric acid washing liquid, it has been tried to subject the washing liquid to a specific filtration such as ultra-filtration, but there is no satisfactory method because of poor material suitable for the device and poor filter suitable for the removal of very fine particles.

Besides, it is known that the aqueous wastes from an oil refinery contain oily substances having an oil specific gravity (API) of 6.5°–12°, and the oily substances can not effectively be removed by any conventional method, because the oily substances have a specific gravity similar to that of water and further separation thereof is hindered by the surface activity of asphaltene contained in the aqueous wastes. It is also known that sewerage sludge is purified up to 80 to 85% of water content by treating with an anionic or cationic coagulating agent, but further removal of water can only be done by drying wghich is not practical and economical.

The present inventor had already found that some water-containing organic materials can be dehydrated by kneading them with some lipophilic high molecular compounds at a softening temperature of the lipophilic high molecular compounds (cf. Japanese Patent Publication No. 37675/1978). However, according to this method, while kneading the water-containing organic materials with the high molecular compounds at a high shearing force, the temperature raises due to the mixing heat, or the kneading mixture shows increased viscosity because of an increase of the content of the organic materials. Hence the kneading material begins to show little or no spinnability and finally can not be used for the kneading.

Thus, there has still never been known any economical and convenient method of the removal of liquid or solid impurities which are usually immiscible and occasionally miscible in a liquid medium and are emulsified or finely suspended to an excess amount of the liquid medium.

As a result of the present inventor's intensive study, it has been found that such liquid or solid impurites contained in a liquid medium can dramatically be removed merely by kneading the impurities-containing liquid medium with easily available, highly viscoelastic materials having an affinity with said impurities and having substantially no affinity with said liquid medium, by which the impurities are taken up by the viscoelastic material and the liquid medium can be recovered in the purified state.

An object of the present invention is to provide an improved method for the removal of liquid or solid impurities which are emulsified or finely suspended in a liquid medium. Another object of the invention is to provide a method for recovering noble resources from liquid mixture and also for separating a pure liquid medium from a liquid mixture, which can be thrown away or reused. A further object of the invention is to provide an economical and practical method for the removal of impurities from impurities-containing liquid mixture by simple operation using easily available, cheap materials. These and other objects and advantages of the present invention will be apparent to persons skilled in the art by the following description.

According to the present invention, the liquid or solid impurities emulsified or finely suspended in a liquid medium can easily be removed from the impurities-containing liquid mixture by kneading the liquid mixture with an easily available, highly viscoelastic material having affinity with said impurities and having substantially no affinity with said liquid medium at a high shearing force, and thereby having the viscoelastic material take up the impurities and separating out a pure liquid medium.

In the present specification, the term "affinity" means not only chemical affinity but also other physical adhesivity.

The method of the present invention can be applied to any liquid mixture containing liquid or solid impurities which may be aqueous substances or oily substances. Examples of the liquid mixtures are liquid mixtures of an aqueous medium such as water or aqueous alcohol (e.g. aqueous methanol or ethanol) and oily impurities such as ultra heavy oil, oil tank sludge, oily substances in oil refinery wastes, oily substances in oil tanker wastes, color substances (predominantly polyphenols) contained in a cane juice in sugar industry, fine carbon particles contained in sulfuric acid washing liquid for gases in oil refinery, smelly components in oil refinery wastes, or the like; liquid mixtures of an aqueous medium such as water or aqueous alcohol and solid organic or inorganic impurities such as fine coal particles, peat, brown coal particles, suspended solid contained in aqueous wastes produced during palm oil-producing step, suspended solid (predominantly palm oil or tallow) contained in aqueous wastes produced during the cold rolling in iron industries, suspended fatty materials contained in sweet water (i.e. a diluted aqueous solution of glycerin), muddy substances contained in extract produced during gelatine-producing step, sludge of sewerage, sludge of activated sludge process, suspended solid contained in aqueous wastes in paper industries, muddy substances contained in molasses, suspended solids contained in aqueous wastes produced in the steps of the production of ethylene-vinyl acetate emulsion copolymer or vinyl acetate emulsion polymer, suspended solid contained in aqueous wastes produced in the step of suspension polymerization of styrene, suspended solid contained in saponification wastes (main medium: methanol or ethanol) produced in the step of production of polyvinyl alcohol, suspended solids contained in process water produced in the steps of production of epoxy resins, or the like.

Other liquid mixtures to be treated are, for example, liquid mixtures of water or aqueous alcohol impurities and a liquid hydrocarbon medium such as lubricating oils, hydraulic fluids, cleaning oils, or the like.

The liquid mixtures, to which the method of the present invention is applicable, contain usually 0.0003 to 50% by weight, preferably 0.0003 to 40% by weight, more preferably 0.0003 to 20% by weight, of the impurities.

The highly viscoelastic materials used in the present invention include any available materials which has a high viscoelasticity and show a spinnability when a shearing force is given thereto with a kneader at a temperature of 0° to 100° C. The viscoelastic materials are a hydrophilic material when the impurities to be removed are aqueous substances, and a lipophilic material when the impurities to be removed are oily substances.

Suitable examples of hydrophilic viscoelastic materials are hydrophilic high molecular materials such as an aqueous solution of polyvinyl alcohol, an aqueous solution of ethylene-vinyl alcohol copolymer, an aqueous solution of polyacrylamide, an aqueous solution of starch, an aqueous solution of gelatine, an aqueous solution of carageenan; hydrophilic comparatively low molecular materials such as an aqueous solution of aluminum hydroxide, water glass; hydrophilic materials produced by chemical, physical or physiochemical reaction such as a viscoelastic material produced by adding a boron compound (e.g. boric acid) to an aqueous solution of polyvinyl alcohol and thereby subjecting to crosslinking reaction, an aqueous solution of alginic acid salt with a polyvalent metal, i.e. di- or tri-valent metal (e.g. calcium alginate, magnesium alginate, aluminum alginate); or a mixture thereof (e.g. an aqueous solution of polyvinyl alcohol and starch). In these hydrophilic viscoelastic materials, the concentration of the aqueous solutions may vary with the kinds of the ingredients and is in the range of 1 to 95% by weight. For instance, in case of alginate, the concentration is preferably from 1 to 10% by weight. In cases of polyvinyl alcohol, ethylene-vinyl alcohol copolymer, and a combination of polyvinyl alcohol and starch (1:1 by weight), the preferable concentrations are 80–90, 40–60, and 30–40% by weight, respectively.

Suitable examples of lipophilic viscoelastic materials are lipophilic high molecular materials such as atactic polypropylene, polystyrene, polyethylene, natural rubbers, synthetic rubbers, polyvinyl chloride, polyvinyl acetate, nylon resins; lipophilic comparativly low molecular materials such as asphalt, pitch, rosin-modified asphalt, grease containing an increased amount of metal soap; or a mixture thereof (e.g. a mixture of atactic polypropylene with asphalt).

Suitable viscoelastic material may be selected based on the kinds of the impurities to be removed, and when the impurities are aqueous substances, hydrophilic viscoelastic materials are usually used, and when the impurities are oily substances, lipophilic viscoelastic materials are usually used, as mentioned above. Oily impurities may also easily be removed with a lipophilic viscoelastic material when it is modified, for example, with asphalt modified with 1 to 2% by weight of natural rosin.

The amount of the viscoelastic materials is not critical and may vary with the degree of affinity of the viscoelastic materials to the impurities to be removed, but they are usually used in an amount of 0.1 to about 3 part by weight to 1 part by weight of the impurities to be removed. When the impurities have a high compatibility with the viscoelastic material, they can unlimitedly be taken up.

It is not clear by what mechanism the impurities can be removed by the method of the present invention, but it is assumed that the impurities-containing liquid mixture is embraced by the viscoelastic material, and the liquid medium having substantially no affinity to the viscoelastic materials is expelled outside, and the impurities having an affinity to the viscoelastic material are taken up thereby. The impurities thus taken up are divided more finely by the action of high shearing force and uniformly dispersed into the viscoelastic material by a phenomenon like solubilization, and thereby the impurities-containing liquid mixture is always contacted with the new surface of the viscoelastic material having a sufficient affinity to the impurities. Anyway, when the impurities have higher viscosity and finer particle size, they are more easily removed.

The kneading in the present invention can be done with any conventional machines which can knead the viscoelastic material, for example, a kneader, Banbury mixer, a screw press, an extruder, or the like. The kneading can be carried out at any temperature where the viscoelastic materials show spinnability and can be kneaded, but is usually carried out at a temperature of from 0° to 100° C., preferably at room temperature from the economical viewpoint. When the viscoelastic material has a lower affinity to the impurities, the kneading is usually carried out at a lower temperature, and when the viscoelastic material has a higher affinity to the impurities, the kneading is usually carried out at a higher temperature. The kneading period of time (i.e. residence time) is not critical either and may vary with the kinds of the impurities and also the kinds of the viscoelastic materials, but 2 to 9 minutes are usually sufficient.

The method of the present invention can be carried out continuously be supplying continuously the impurities-containing liquid mixture into the kneading machine including an appropriate amount of a viscoelastic material, wherein the impurities are continuously taken up by the viscoelastic material and the purified liquid medium is continuously taken out from the kneading machine. When the viscoelastic material takes up the impurities, the amount of the viscoelastic material is increased, and then, the excess amount of the viscoelastic material is also taken out. In this case, the viscoelastic material may occasionally decrease or increase the viscosity because of taking up the impurities. For instance, when an aqueous waste containing only impurities is kneaded with asphalt, the viscosity of the asphalt is decreased (in case the oily impurities are soft) or increased (in case the only impurities are hard) with the lapse of kneading period of time. In such a case, the viscosity of the viscoelastic material can be controlled by changing the kneading temperature (by cooling or by heating), or alternatively, by adding an appropriate viscosity-increasing or -decreasing agent. Suitable examples of the viscosity-increasing agents for lipophilic viscoelastic materials are a highly viscous residue of vacuum distillation in petroleum refining, coal powder having a high quality, and those for hydrophilic viscoelastic materials are polyvinyl alcohol powder, boron compounds, or the like. Suitable examples of viscosity-decreasing agents for lipophilic viscoelastic materials are heavy oil, or the like.

According to the method of the present invention, the liquid or solid impurities can easily and continuously be removed by a simple operation within a very short period of time from liquid mixture wherein the liquid or solid impurities are contained in a liquid medium in the state of emulsion or suspension, which could never been purified by the conventional purifying methods such as reverse osmosis, coagulation (aggregation) and filtration, ultra-centrifugation, or the like.

The present invention is illustrated by the following Examples but is not limited thereto.

EXAMPLE 1

Treatment of sulfuric acid waste produced in the step of washing of olefins:

Purification of olefins in petroleum refinery is usually carried out by washing with diluted aqueous sulfuric acid. The sulfuric acid washing liquid contains very fine particles of carbon and also sulfonated hydrocarbons, and hence, it shows increased viscosity during recycling and finally becomes unuseable. Accordingly, it has been attempted to remove the impurities by subjecting the washing liquid to ultra-filtration, but it has not been successful.

Such a sulfuric acid washing liquid was purified as follows.

Into a kneader (horse power: 2-5 HP, revolution: 30-129 r.p.m.), wherein a viscoelastic material as shwon in Table 1 was previously entered, the sulfuric acid washing liquid was continuously charged, and the mixture was kneaded for a residence time of 2 to 9 minutes at a temperature as shown in Table 1. The results are shown in Table 1.

TABLE 1

| Viscoelastic material | Kneading temp. | Removal rate of carbon | Removal rate of sulfonated hydrocarbons | Properties of the purified sulfuric acid washing liquid |
|---|---|---|---|---|
| Asphalt 60/80 | 30–38° C. | 90% | 30% | Tranparent, decreased viscosity |
| Atactic polypropylene | 50–59° C. | " | " | Transparent, decreased viscosity |
| High pressure process polyethylene | 90–100° C. | " | " | Transparent, decreased viscosity |
| Asphalt + atactic polypropylene | 30–38° C. | " | " | Transparent, decreased viscosity |

EXAMPLE 2

Purification of used lubricating oil:

Used lubricating oils contain increased amount of water (water content: about 1000 ppm) and inorganic materials (predominantly iron oxides).

The used oils were treated in the same manner as described in Example 1 by using the viscoelastic materials as shown in Table 2. The results are shown in Table 2.

TABLE 2

| Viscoelastic material | Kneading temp. | Properties of purified oils |
|---|---|---|
| 60% aqueous solution of polyvinyl alcohol (saponification degree: 99.9%, average polymerization degree: 1,950) | 20–28° C. | Transparent, water content: less than 100 ppm |
| Ethylene-vinyl alcohol copolymer | 20–28° C. | Transparent, water content: less than 26 ppm |
| 60% aqueous solution of polyvinyl alcohol + starch (1:1 by weight) | 20–28° C. | Transparent, water content: less than 100 ppm |
| 40% aqueous solution of polyvinyl alcohol + boric acid (1% by weight based on the weight of polyvinyl alcohol) | 20–28° C. | Transparent, water content: less than 100 ppm |

EXAMPLE 3

Treatment of oil-containing aqueous waste:

An aqueous waste of petroleum refinery contains carbon and surface active oily substances (oil content: 1% by weight, oil specific gravity (API): 6.5°–12°), which can not be separated by standing, centrifugation or filtration. The impurities of the aqueous waste are usually removed and disposed by adding a coagulating agent to the aqueous waste, separating the resultant floating materials by filtration with diatomaceous earth, and followed by burning after mixing with a fuel additive.

The aqueous waste of petroleum refinery was treated in the same manner as described in Example 1 by using the viscoelastic materials as shown in Table 3. The results are shown in Table 3.

TABLE 3

| Viscoelastic material | Kneading temp. | Results |
|---|---|---|
| Atactic polypropylene | 80–95° C. | Oily substances were taken up, and the separated water was transparent and had no smell |
| Polyethylene | 90–100° C. | Oily substances were taken up, and the separated water was transparent and had no smell |
| Asphalt | 30–38° C. | Oily substances were taken up, and the separated water was transparent and had no smell |
| Asphalt + natural rosin (2% by weight based on the weight of asphalt) | 30–38° C. | Oily substances were taken up, and the separated water was transparent and had no smell |
| Asphalt + atactic polypropylene (30% by weight based on the weight of asphalt) | 60–70° C. | Oily substances were taken up, and the separated water was transparent and had no smell |
| Asphalt + polystyrene (30% by weight based on the weight of asphalt) | 60–70° C. | Oily substances were taken up, and the separated water was transparent and had no smell |

EXAMPLE 4

Treatment of aqueous waste produced in the step of production of epoxy resin and aqueous waste produced in the step of production of polystyrene:

The aqueous waste produced in the step of production of epoxy resin contains fine particles of resin and epichlorohydrin, and the aqueous waste produced in the step of production of polysteyrene contains fine particles of polystyrene.

Asphalt 60/80 was previously heated at 80° C. and the molten asphalt 60/80 was added to a kneader (horse power: 0.5 HP, volume: 4 liters, revolution: 5–100 r.p.m.), and thereto was added water (20% by weight based on the weight of asphalt) under kneading and cooling by passing cold water through the jacket, whereby the asphalt showed spinnability. With keeping the temperature of the asphalt at 30° C., the above aqueous wastes were added thereto and kneaded for a residence time of 2 to 9 minutes. The results are shown in Table 4.

For comparison purpose, the aqueous waste in the production of epoxy resin was treated with Sparkler filter using paper filter, and the aqueous waste in the production of polystyrene was treated with a filter press using cloth filter. The results are also shown in Table 4.

TABLE 4

| Aqueous waste | Method of the present invention | Reference method |
|---|---|---|
| Aqueous waste in the production of epoxy resin | Suspended solid: no, epichlorohydrin: no, separated water could be re-used | Filter pores were largely closed and hence precoated filter was required. epichlorohydrin could not be removed. |
| Aqueous waste in the production of polystyrene | Suspended solid: no, separated water could be re-used | Filter pores were largely closed |

EXAMPLE 5

Treatment of aqueous waste in oil refinery:

An aqueous waste in oil refinery is usually treated firstly with an oil-water separator specified by American petroleum Institute (API), secondly with parallel plate interceptor (PPI), and thirdly with active carbon and then is discharged.

The aqueous waste was treated in the same manner as described in Example 4 by using the viscoelastic materials as shown in Table 5. The aqueous waste contained oily substances of 1,000 ppm before treated with API, 30 ppm before treated with PPI and 3–5 ppm before treated with active carbon. The results are shown in Table 5.

TABLE 5

| | Aqueous waste (content of oily substances) | | |
|---|---|---|---|
| Viscoelastic material | Before treated with API (1,000 ppm) | Before treated with PPI (30 ppm) | Before treated with active carbon (3–5 ppm) |
| Asphalt 60/80 | Oily substance: trace, no smell | Oily substance: trace, no smell | Oily substance: trace, no smell |
| Asphalt 100/200 | Oily substance: trace, no smell | Oily substance: trace, no smell | Oily substance: trace, no smell |
| Asphalt + natural rosin (2% by weight based on the weight of asphalt) | Oily substance: trace, no smell | Oily substance: trace, no smell | Oily substance: trace, no smell |
| Atactic polypropylene | Oily substance: trace, no smell | Oily substance: trace, no smell | Oily substance: trace, no smell |

EXAMPLE 6

Removal of coloring materials from cane juice:

When cane juice is obtained by pressing, the juice colors with lapse of time and finally becomes brown. This cane juice is usually decolored by treating with bone black.

The cane juice was decolored by treating in the same manner as described in Example 4 by using the viscoelastic materials as shown in Table 6. The results are shown in Table 6.

TABLE 6

| Viscoelastic material | Properties of juice treated |
|---|---|
| Atactic polypropylene | Faint yellow, no change of color with lapse of time |
| Atactic polypropylene + rosin (2% by weight based on the weight of polypropylene) | Faint yellow, no change of color with lapse of time |
| Asphalt 60/80 | Faint yellow, no change of |

TABLE 6-continued

| Viscoelastic material | Properties of juice treated |
| --- | --- |
| | color with lapse of time |

EXAMPLE 7

Treatment of aqueous waste produced in palm oil producing factory:

An aqueous waste produced in palm oil producing factory (suspended solid: 80% by volume, COD: about 140,000 ppm, pH: 4.5–5.0) was treated in the same manner as described in Example 4 by using the viscoelastic materials as shown in Table 7. The results are shown in Table 7.

TABLE 7

| Viscoelastic material | Kneading temp. | Properties of water thus separated out |
| --- | --- | --- |
| Polyethylene | 80–90° C. | Faint yellow, COD: 2,000 ppm suspended solid: 0% by volume |
| Asphalt 60/80 | 30–38° C. | Faint yellow, COD: 2,000 ppm suspended solid: 0% by volume |

EXAMPLE 8

Treatment of saponification waste produced in the step of production of polyvinyl alcohol:

Polyvinyl alcohol is usually produced by saponifying polyvinyl acetate in methanol (or ethanol) with sodium hydroxide. The saponification waste comprises predominantly methanol (or ethanol) and contains methyl acetate (or ethyl acetate) and also fine particles of polyvinyl alcohol. The impurities of the saponification waste are usually removed by centrifugation or filter press, but the filtrate thus obtained still contains fine particles, which causes some trouble when used in the next step therein.

The saponification waste was treated in the same manner as described in Example 1 by using the viscoelastic materials as shown in Table 8. The results are shown in Table 8.

TABLE 8

| Viscoelastic material | Kneading temp. | Results |
| --- | --- | --- |
| Atactic polypropylene | 20–28° C. | Separated liquid was transparent, but impurities were taken up only in an amount of 1:1 by weight (impurities: viscoelastic material) |
| 60% aqueous solution of polyvinyl alcohol | 20–28° C. | Impurities were almost unlimitedly taken up when viscosity of the viscoelastic material was controlled. Separated liquid was transparent |

EXAMPLE 9

Treatment of aqueous wastes produced in the step of emulsion polymerization of ethylene-vinyl acetate, styrene or vinyl acetate:

Aqueous wastes produced in the step of emulsion polymerization of ethylene-vinyl acetate, styrene or vinyl acetate are turbid and contain about 1% by weight of polymers. It is desirable to recover and re-use water from the aqueous wastes because purified water is used in the step of emulsion polymerization, but it should be purified in order to remove the contained large particles. These aqueous wastes are usually purified by a combination of aggregation, filtration and burning of the filtered impurities, because ultra-filtration can not be used due to closing of the filter pores by particles.

These aqueous wastes were treated in the same manner as described in Example 1 by using the viscoelastic materials as shown in Table 9. The results are shown in Table 9.

TABLE 9

| Viscoelastic material | Aqueous waste in ethylene-vinyl acetate polymerization | Aqueous waste in styrene polymerization | Aqueous waste in vinyl acetate polymerization |
| --- | --- | --- | --- |
| Atactic polypropylene | Impurities were almost unlimitedly taken up. separated water was transparent and had no smell | Impurities were almost unlimitedly taken up. separated water was transparent and had no smell | Impurities were taken up in an amount of 1:1 (impurities: viscoelastic material). separated water was transparent and had no smell |
| Vinyl acetate polymer | Impurities were unlimitedly taken up. separated water was transparent and had no smell | Impurities were taken up in an amount of 1:1 (impurities: viscoelastic material). separated water was transparent and had no smell | Impurities were unlimitedly taken up. separated water was transparent and had no smell |
| Ethylene-vinyl acetate copolymer | Impurities were unlimitedly taken up. separated water was transparent and had no smell | Impurities were unlimitedly taken up. separated water was transparent and had no smell | Impurities were unlimitedly taken up. separated water was transparent and had no smell |
| Mixture of atactic polypropylene and styrene (1:0.5) | Impurities were unlimitedly taken up. separated water was transparent and had no smell | Impurities were unlimitedly taken up. separated water was transparent and had no smell | Impurities were unlimitedly taken up. separated water was transparent and had no smell |
| Natural rubber (kneading temp: 60–70° C.) | Impurities were unlimitedly taken up. separated water was transparent and had no smell | Impurities were unlimitedly taken up. separated water was transparent and had no smell | Impurities were unlimitedly taken up. separated water was transparent and had no smell |
| Asphalt 60/80 | Impurities were unlimitedly taken up. separated water was transparent and had no smell | Impurities were unlimitedly taken up. separated water was transparent and had no smell | Impurities were unlimitedly taken up. separated water was transparent and had no smell |

EXAMPLE 10

Treatment of sludges:

Activated sludge, excess sludge in activated sludge process and sewerage sludge contain usually 1–1.7% by weight of suspended solid. These sludges are usually treated with a cationic or anionic coagulating agent to reduce the water content to 80 to 85% by weight. But it is necessary to concentrate and reduce the water content to 60% by weight or lower in order to burn them, for which purpose expensive energy is required.

These sludges were treated in the same manner as described in Example 1 by using the viscoelastic materials as shown in Table 10.

TABLE 10

| Viscoelastic material | Sewerage sludge (water content: 99% by weight) | Remaining sludge after concentrating activated sludge (water content: 85% by weight) |
|---|---|---|
| Atactic polypropylene | Sludge of 30% by weight (in dry state) was taken up, and water was separated out | Sludge was taken up while the amount was somewhat smaller than the case of sewerage sludge, and water was separated out |
| Atactic polypropylene + rosin (2% by weight based on the weight of atactic polypropylene) | Sludge of 30% by weight (in dry state) was taken up, and water was separated out | Sludge was taken up while the amount was somewhat smaller than the case of sewerage sludge, and water was separated out |
| Asphalt 60/80 | Sludge of 40% by weight (in dry state) was taken up, and water was separated out | Sludge was taken up while the amount was somewhat smaller than the case of sewerage sludge, and water was separated out |
| Asphalt 60/80 + rosin (2% by weight based on the weight of asphalt) | Sludge was taken up while the amount was somewhat larger than the case of asphalt alone, and water was separated out | Sludge was taken up while the amount was somewhat smaller than the case of sewerage sludge, and water was separated out |

EXAMPLE 11

Treatment of peat:

Peat has usually a water content of 70% by weight and the dehydration thereof is not carried out in an industrial scale.

An aqueous suspension of peat containing 1-2% by weight of solid materials was treated in the same manner as described in Example 1 by using the viscoelastic materials as shown in Table 11. The results are shown in Table 11.

TABLE 11

| Viscoelastic material | Results |
|---|---|
| Asphalt 60/80 | Peat was taken up by the viscoelastic material, and colorless, transparent water was separated out. When the amount of impurities peat taken up became over 1:1 by weight, the viscoelastic material became hard |
| Asphalt 100/200 | Peat was taken up by the viscoelastic material, and colorless, transparent water was separated out. When the amount of impurities peat taken up became over 1:1 by weight, the viscoelastic material became hard |
| Atactic polypropylene | Peat was taken up by the viscoelastic material, and colorless, transparent water was separated out. When the amount of impurities peat taken up became over 1:1 by weight, the viscoelastic material became hard |

EXAMPLE 12

When aqueous peat suspension, heavy oil-containing aqueous waste and sewerage sludge were treated in the same manner as described in Example 1 by using the viscoelastic material as shown in Table 12, the viscosity of the viscoelastic material occasionally decreased or increased, by which the continuous operation was hindered. In order to control the viscosity, some materials as shown in Table 12 were added or the kneading temperature was changed and thereby the kneading could be continued.

TABLE 12

| Viscoelastic material | Heavy Oil-containing aqueous waste (viscosity: increased) | Aqueous peat suspension (viscosity: increased) | Sewerage sludge (viscosity: decreased) |
|---|---|---|---|
| Asphalt 60/80 | C-heavy oil was added in an amount of 10-20% by weight based on the weight of asphalt | C-heavy oil was added in an amount of 10-50% by weight based on the weight of asphalt | Asphalt 100/200 or asphalt 60/80 was added in an amount of 50% or 20% by weight based on the weight of asphalt, respectively |
| Asphalt 60/80 (original kneading temp: 30-38° C.) | Kneading temperature was raised up to 50-58° C. (raising rate: 20° C.) | Kneading temperature was raised up to 50-58° C. (raising rate: 20° C.) | Kneading temperature was lowered to 10-18° C. (lowering rate: 20° C.) |

EXAMPLE 13

Aqueous dispersion of activated sludge (solid content: 1% by weight) was added to kneading atactic polypropylene at 25° C. and the mixture was continuously kneaded. As a result, the polymer brown-colored, and transparent water was separated out therefrom. The activated sludge was taken up by the polymer in an amount of up to 20% by weight. The separated water was evaporated to give an organic residue of 0.01% by weight.

EXAMPLE 14

To asphalt (100 parts by weight) was added rosin (5 parts by weight) and the mixture was previously kneaded with a kneader at 20° C. To the mixture was gradually added aqueous emulsion waste [content of organic materials (ethylene-vinyl acetate copolymer): 0.1% by weight] (5,000 parts by weight) with continuous kneading. As a result, the organic materials were taken up by the kneading mixture and water discharged from the bottom of kneader was colorless and transparent. No organic material was detected from the separated water.

EXAMPLE 15

To polyvinyl alcohol (polymerization degree: 1,950, saponification degree: 99%) (100 parts by weight) was added water (100 parts by weight), and the mixture was uniformly mixed with a kneader. Thereafter, petroleum resin 90 # was added to the mixture in an amount of 3% by weight based on the weight of polyvinyl alcohol, which mixture was uniform.

Lubricating oil waste (100 parts by weight) was added to the above system, and the mixture was kneaded at 20° C. As a result, the oil discharged from the bottom of kneader was faint yellow and transparent, which color phase was the same as that of a new oil. The transparent degree of the separated oil was 100, on the other hand, the transparent degree of the original oil before treating was 20.

EXAMPLE 16

During the operation as disclosed in Example 15, the kneading polyvinyl alcohol mixture became blackish in color. To the mixture was added water (900 parts by weight) and the mixture was kept at 85° C. and then became homogeneous. The mixture was further allowed to stand at 85° C. for 2 hours. As a result, a dirty tar layer raised up to the upper part and black solid materials precipitated at the bottom, and the interlayer was an aqueous layer of polyvinyl alcohol which was transparent while it was somewhat colored.

EXAMPLE 17

Asphalt (100 parts by weight) was previously kneaded with a kneader at 30° C., and thereto was added dropwise cane juice (100 parts by weight) which was obtained from sugar cane. After the mixture was kneaded for 15 minutes, faint yellow transparent cane juice was separated out from the discharging opening at the bottom of the kneader. The cane juice thus separated did not change in color to brown even with lapse of time. As a result of analysis of this cane juice thus separated, it contained no polyphenol which is an impurity contained in the untreated cane juice.

EXAMPLE 18

Polyvinyl alcohol (polymerization degree: 1,950, saponification degree: 99%) (50 parts by weight) and water (50 parts by weight) were mixed and previously kneaded with a kneader at 30° C. Water-containing lubricating oil (water content: 0.7% by weight) (50 parts by weight) was added to the above kneaded mixture. After the mixture was kneaded for 15 minutes, transparent lubricating oil was separated out from the discharging opening at the bottom of the kneader. The separated lubricating oil had a water content of less than 100 ppm.

EXAMPLE 19

Muddy material (water content: 50% by weight) (300 parts by weight) obtained from an oil tank was gradually added to asphalt (100 parts by weight) which was previously kneaded at 30° C. When the asphalt was continuously kneaded, the asphalt layer became faint brownish color and the muddy material was uniformly taken up by the asphalt layer. By the kneading, the temperature raised from 30° C. to 38° C., and when the temperature was lowered to 30° C., water (50 parts by weight) was separated out from the system. When the temperature of the kneading system was further lowered to 20° C., water (30 parts by weight) was further separated out.

EXAMPLE 20

Muddy material (water content: 30% by weight) (300 parts by weight) obtained from an oil tank was gradually added to asphalt (100 parts by weight) which was previously kneaded at 30° C. When the asphalt was continuously kneaded, the asphalt layer became faint brownish color and the muddy material was uniformly taken up by the asphalt layer. By the kneading, the temperature raised to 39° C. A very hard asphalt (50 parts by weight) was added to the kneaded asphalt, and the mixture was further kneaded. The resulting kneading system had a temperature of 39° C., but water (30 parts by weight) was separated out from the system.

EXAMPLE 21

A mixture (300 parts by weight) of rocky shape oil mass (50% by weight), water (30% by weight) and oil (20% by weight) which was obtained during repairing of an oil tank was gradually added to asphalt (100 parts by weight) which was previously kneaded at 30° C. When the mixture was continuously kneaded, the oil mass was uniformly taken up by the asphalt within 2 minutes, and thereafter, the water and oil were also uniformly taken up. The asphalt layer had a temperature of 37° C. Even though the temperature of system was lowered to 30° C., no water was separated out. When rosin was added to the system and the mixture was kneaded at the same temperature, water (30 parts by weight) was separated out from the system.

EXAMPLE 22

A part of a 20% peat slurry was added to asphalt 60/80 which was previously kneaded at 40° C. After kneading the mixture for 2 minutes, water was separated out from the system, while it showed a faint brownish yellow color. Thereafter, the above peat slurry was continuously added to the kneading system and subjected to dehydration continuously.

With proceeding the continuous operation, the viscosity of the kneading system gradually raised, which resulted in difficulty of kneading and finally in insufficient kneading. Then C-heavy oil was added to the kneading system, by which the kneading was again smoothly done so as to be able to add continuously the peat slurry and to subject it to continuous dehydration. This operation was repeated ten times, and all times, the continuous addition of the peat slurry and the continuous dehydration were sufficiently carried out. In the above operation, C-heavy oil was added in an amount of 10 to 50% by weight based on the weight of solid materials contained in the peat slurry.

What is claimed is:

1. A method for removal of oily or solid impurities from an impurities-containing liquid mixture wherein the impurities are emulsified or finely suspended in a liquid medium, which comprises kneading the impurities-containing liquid mixture with a viscoelastic material in a viscoelastic state which has an affinity with said impurities, has substantially no affinity with said liquid medium, has a viscoelasticity and shows a spinnability when a shearing force is given thereto with a kneader at a temperature of 0° to 100° C. and thereby having the viscoelastic material take up the impurities and separating out the purified liquid medium from the kneading system.

2. A method according to claim 1, wherein the impurities-containing mixture consists of 0.0003 to 50% by weight of an oily impurity and an aqueous medium.

3. A method according to claim 2 wherein the content of impurity is in the range of 0.0003 to 40% by weight.

4. A method according to claim 2, wherein the impurities-containing liquid mixture consists of an aqueous medium selected from water and an aqueous alcohol, and an oily impurity selected from the group consisting of an ultra heavy oil, oil tank sludge, oily substances in oil refinery wastes, oily substances in oil tanker waste, color substances contained in a cane juice in sugar industry, fine carbon particles contained in sulfuric acid washing liquid for gases in oil refinery, and smelly components in oil refinery wastes.

5. A method according to claim 1, wherein the impurities-containing liquid mixture consists of 0.0003 to 50% by weight of a solid impurity and an aqueous medium.

6. A method according to claim 5, wherein the impurities-containing liquid mixture consists of an aqueous medium selected from water and an aqueous alcohol, and a solid impurity selected from the group consisting of fine coal particles, peat, brown coal particles, suspended solid contained in aqueous wastes produced during palm oil-producing step, suspended solid contained in aqueous wastes produced during cold rolling in iron industries, suspended fatty material contained in sweet water, muddy substances contained in extract produced during gelatine-producing step, sludge of sewerage, sludge of activated sludge process, suspended solid contained in aqueous wastes in paper industries, muddy substances contained in molasses, suspended solid contained in aqueous wastes produced in the step of production of ethylene-vinyl acetate emulsion copolymer or vinyl acetate emulsion polymer, suspended solid contained in aqueous wastes produced in the step of suspension polymerization of styrene, suspended solid contained in saponification wastes produced in the step of production of polyvinyl alcohol, and suspended solid contained in process water produced in the steps of production of epoxy resins.

7. A method according to claim 4 or 6, wherein the viscoelastic material to be used is a member selected from the group consisting of atactic polypropylene, polystyrene, polyethylene, natural rubber, synthetic rubber, polyvinyl chloride, polyvinyl acetate, nylon resin, asphalt, pitch, rosin-modified asphalt, grease having increased content of metal soap, and a mixture of two or more thereof.

8. A method according to claim 1, wherein the kneading is carried out at a kneading temperature of from 0° to 100° C. for a residence time of 2 to 9 minutes.

9. A method for removal of oily or solid impurities from an impurities-containing liquid mixture wherein the impurities are emulsified or finely suspended in a liquid medium, which comprises kneading the impurities-containing liquid mixture with a viscoelastic asphalt material in a viscoelastic state which has an affinity with said impurities, has substantially no affinity with said liquid medium, has a viscoelasticity and shows a spinnability when a shearing force is given thereto with a kneader at a temperature of 0° to 100° C. and thereby having the viscoelastic asphalt material take up the impurities and separating out the purified liquid medium from the kneading system.

10. A method according to claim 9, wherein the impurities-containing mixture consists of 0.0003 to 50% by weight of an oily impurity and an aqueous medium.

11. A method according to claim 10, wherein the impurities-containing liquid mixture consists of an aqueous medium selected from water and an aqueous alcohol, and an oily impurity selected from the group consisting of an ultra heavy oil, oil tank sludge, oily substances in oil refinery wastes, oily substances in oil tanker waste, color substances contained in a cane juice in sugar industry, fine carbon particles contained in sulfuric acid washing liquid for gases in oil refinery, and smelly components in oil refinery wastes.

* * * * *